W. L. LORANGER.
DIRIGIBLE HEADLIGHT.
APPLICATION FILED NOV. 10, 1916.

1,300,426.

Patented Apr. 15, 1919.

Inventor
WALTER L. LORANGER.

By Charles E. Wiener
Attorney

Witness
Emmens B. Wiener.

UNITED STATES PATENT OFFICE.

WALTER L. LORANGER, OF HIGHLAND PARK, MICHIGAN.

DIRIGIBLE HEADLIGHT.

1,300,426.  Specification of Letters Patent.  Patented Apr. 15, 1919.

Application filed November 10, 1916. Serial No. 130,511.

*To all whom it may concern:*

Be it known that I, WALTER L. LORANGER, a citizen of the United States, residing at Highland Park, county of Wayne, State of Michigan, have invented a certain new and useful Improvement in Dirigible Headlights, and declare the following to be a full, clear, and exact description of the same, such as will enable others skilled in the art to which it pertains to make and use the same, reference being had to the accompanying drawings, which form a part of this specification.

This invention relates to dirigible headlights for automobiles and its object is a simple, inexpensive and efficient apparatus for turning the head lights in a direction coinciding with the direction in which the steering wheels are turned in order to light the roadway in front of the vehicle.

Another object of the invention is a device of the character stated by means of which a lamp mounted on the chassis or body of the vehicle may be operated by a portion of the steering mechanism carried by the axle whereby the lamp is maintained comparatively free from road shock by reason of being carried on a spring supported chassis.

These and other objects and the several novel features of the invention in its preferred form are hereinafter more fully described and claimed and shown in the accompanying drawings in which—

Similar characters refer to similar parts throughout the drawing and specification.

Figure 1:
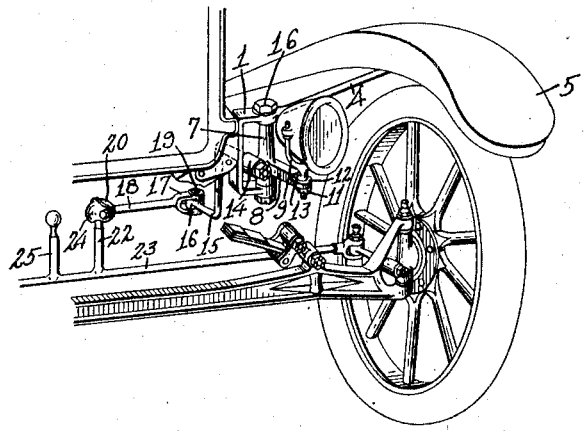
Figure 1 is a perspective view of a portion of an automobile showing my improved dirigible headlight.
Figure 2:
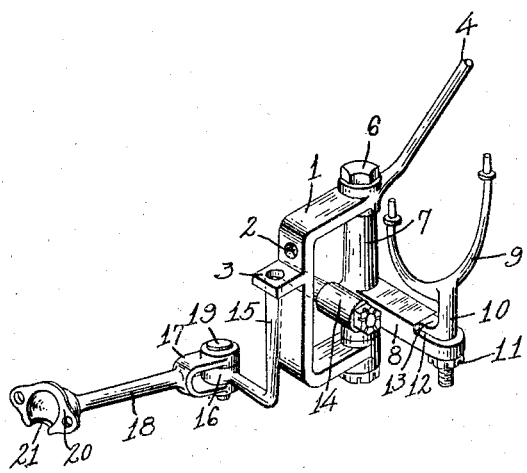
Fig. 2 is an enlarged perspective view of the means employed in connecting the headlight support to the steering arm of an automobile.

The device consists of a bracket 1 substantially C shaped in form having an aperture 2 and an apertured lug 3 on a vertical portion thereof whereby it may be secured to the frame of the automobile. This C shaped portion is integrally formed with an arm 4 extending upwardly and outwardly therefrom at an angle which, as may be understood from Fig. 1 serves as a support for a fender 5 of the automobile. There is a bracket 1 on each side of the front end of the chassis and the several parts are duplicated on opposite sides for the the lamps and are operated in identical manner one with the other. A description of the mechanism for operating one headlight, therefore, is deemed sufficient to fully disclose the construction and operation of the complete device. A vertical bolt 6 connects the terminals of what may be considered the C portion of the bracket and a spindle 7 is rotatably mounted on this bolt which may be provided with a bushing, if so desired. The spindle 7 is provided with a forwardly extending arm 8 apertured at the end to receive the U shaped lamp support 9. The stem 10 of this support passes through an aperture in the arm 8 and is provided with a nut 11 for securing the same in place. The arm is notched as indicated at 12 and the stem 10 is provided with a squared portion 13 engaging the notched portion of the arm preventing rotation of the stem 10 in the arm. The lamp is thus maintained in exact relationship with the spindle at all times.

The spindle is also provided with a horizontally apertured lug 14 to receive the end of the Z shaped arm 15 which may be secured therein in any approved manner and held from rotation in the lug. The arm 15 extends rearwardly of the spindle and terminates in an eye 16 engaged by the bifurcated end 17 of the operating arm or bar 18. A pin or bolt 19 serves to connect the bifurcated end 17 and eye portion 16. The opposite end of the bar 18 is provided with a socket 20 formed with a cut out portion 21 to engage about a stem 22 secured to the steering arm 23 of the vehicle, as will be understood from Fig. 1. A cap 24 complementary to the portion 20 of the arm 18 engages about a ball on the end of the stem 22. The aperture 21 is of sufficient size to allow considerable flexibility in the connection between the arm 18 and the stem 22, which permits of the chassis moving relative to the steering arm 23 without detriment to the lamp control apparatus. Such flexibility is required by reason of the spring suspension of the chassis on the axle.

The headlight on the opposite side of the vehicle (not here shown) is connected with the steering arm by means of a stem 25 having a ball end and being identical in form with the stem 22. The other connecting parts and bracket are also similar except that the spindle and lugs are opposite in relationship being right and left hand respectively, as is required by reason of their mounting.

With both lamps connected to the stems 22 and 25 respectively, as above described, movement of the steering arm 23 transversely of the vehicle to turn the steering wheels in the usual manner correspondingly moves the headlight in each instance exactly similar to the movement of the steering wheels and in the same direction. By this arrangement the lights are focused on the road in the direction in which the vehicle is turned to move.

From the foregoing description it becomes evident that the device is comparatively simple and inexpensive in construction, and is automatic in operation.

Having thus briefly described my invention, its utility and mode of operation, what I claim and desire to secure by Letters Patent of the United States is—

1. A lamp and bracket for automobiles having a steering arm, consisting of a substantially C shaped bracket adapted to be secured to the forward end of the vehicle frame, the upper horizontal member of the bracket having an upwardly and outwardly extending portion providing a fender arm, a spindle rotatably mounted in the bracket between the horizontal portions thereof, said spindle having a forwardly projecting arm, a lamp member fixedly secured to the forward end of the arm, said arm positioning the lamp forward of and below the point of connection of the bracket and fender, and means pivotally connecting the spindle and the said steering arm.

2. A lamp support and bracket for automobiles having a steering arm, consisting of a substantially C shaped bracket adapted to be secured to the forward end of the vehicle frame, the upper horizontal member of the bracket having an upwardly and outwardly extending portion providing a fender arm, a spindle rotatably mounted on a vertical axis between the horizontal portions of the bracket and being provided with a forwardly projecting arm, a lamp member secured to the forward end of the arm, a second arm adjustable about a horizontal axis secured to the spindle and extending to the rear thereof, a bar pivoted on a vertical axis to the said second arm, and a ball and socket connection between the said bar and said steering arm.

In testimony whereof I sign this specification.

WALTER L. LORANGER.

Copies of this patent may be obtained for five cents each, by addressing the "Commissioner of Patents, Washington, D. C."